Patented Sept. 4, 1951 2,566,342

UNITED STATES PATENT OFFICE 2,566,342

STEROID THIOESTERS

Robert H. Levin, A. Vern McIntosh, Jr., and George B. Spero, Kalamazoo, Mich., assignors to The Upjohn Company, Kalamazoo, Mich., a corporation of Michigan No Drawing. Application September 15, 1947,
Serial No. 774,176

12 Claims. (Cl. 260—397.1)

The present invention relates to steroid thioesters, and is more particularly concerned with certain steroid thioesters of the formula:

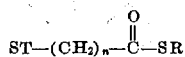

$$ST-(CH_2)_n-\overset{O}{\underset{\|}{C}}-SR$$

wherein ST represents a pregnane or pregnene nucleus, attached to the side-chain at the 20 position, and wherein $n$ is selected from zero, one and two.

It is an object of the present invention to provide novel steroid thioesters. An additional object is the provision of a novel process for the preparation of steroid thioesters. Other objects of the invention will become apparent hereinafter.

Members of the new group of compounds have been prepared, isolated, and found to be valuable intermediates in the preparation of more complex organic molecules, including certain hormones, and especially steriod aldehydes, as disclosed in our copending application Serial 777,577.

Among acids which may be employed as suitable starting materials for the preparation of the thioesters are the bile acids, e. g., cholanic acid, of the formula:

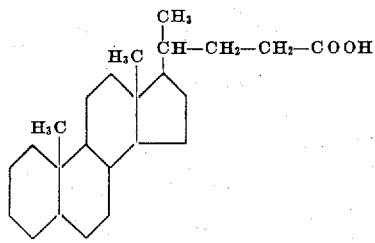

cholenic acid, of the formula:

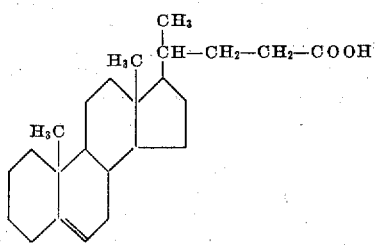

lithocholic acid, of the formula:

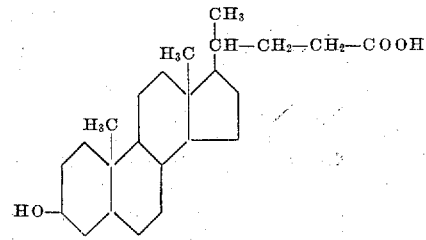

desoxycholic acid, of the formula:

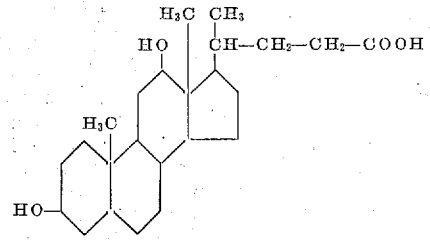

cholic acid, of the formula:

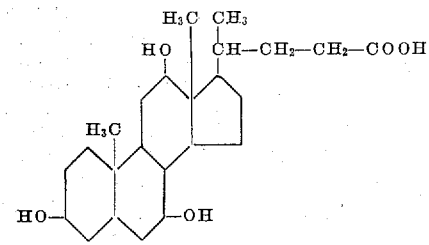

and tetrahydroxycholanic acid, of the formula:

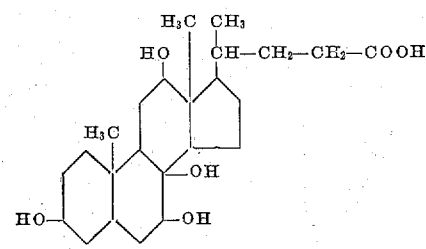

Likewise, other unsaturated bile acids, such as 3-hydroxy-(delta-5)-cholenic and 3-hydroxy-(delta-5,7)-choladienic acids, and ester or ether derivatives of the hydroxy compounds are suitable starting materials.

Other suitable acids are those having one less side-chain carbon atom, i. e., the nor-cholanic acids, and related compounds having substituents as given above in the cholanic series. The nor-cholanic series has the general structure:

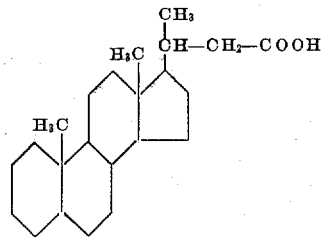

The bisnor-cholanic acids have two less carbon atoms in the side-chain, e. g.:

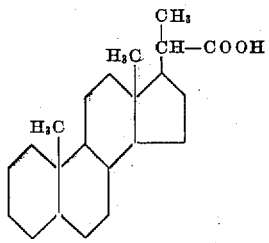

and these acids are also suitable starting materials.

Acids, having the designated side-chains, with additional substituents in the pregnane nucleus, such as hydroxyl groups, esters and ether derivatives of hydroxyl groups, including i-ethers and esters; ketones, ketone derivatives, enol ethers and esters of ketones; amines; protected, e. g., as dihalide or hydrohalide, or unprotected double bonds; and halogen atoms, may also be used as starting materials. Compounds having some of the mentioned substituents have been indicated for the first series, but any compound having the prescribed pregnane nucleus and the specified—CH$_2$—CH$_2$—COOH, —CH$_2$—COOH, or —COOH side-chain, regardless of other nuclear substituents, may be employed. For example, 3,6-diketoallocholanic acid, 3,11-diketocholanic acid, 3-chloro-(delta 5)-cholenic acid, 3-acetoxy-(delta 5)-cholenic acid, 3-methoxy-(delta 5)-nor-cholenic acid, 3,12-diethoxy-nor-cholanic acid, and 3-acetoxy-(delta 5)-bisnor-cholenic acid are entirely satisfactory starting materials. Stereoconfiguration of substituents on the pregnane nucleus is immaterial, as the production of the thioesters is accomplished with facility regardless of the space factor.

The selected steroid acid may be converted to the corresponding thioester by either of two procedures, both of which may proceed through the acid chloride. The first (A) involves reaction of the acid halide, e. g., bromide or chloride, with a mercaptan, preferably in the presence of an acid-binding agent, e. g., pyridine, substituted pyridines, dimethylaniline, quinoline; or in an inert organic solvent, e. g., ether, benzene, toluene, xylene, or petroleum hydrocabrons, in the presence of an acid-binding agent, e. g., pyridine, sodium bicarbonate, magnesium or calcium oxide. The second (B) involves reaction of the acid chloride with a metallic mercaptide, e. g., a lead, zinc, or aluminum mercaptide, in an inert organic solvent, e. g., ether, benzene, toluene, according to the following sequence as illustrated for an unsubstituted acid:

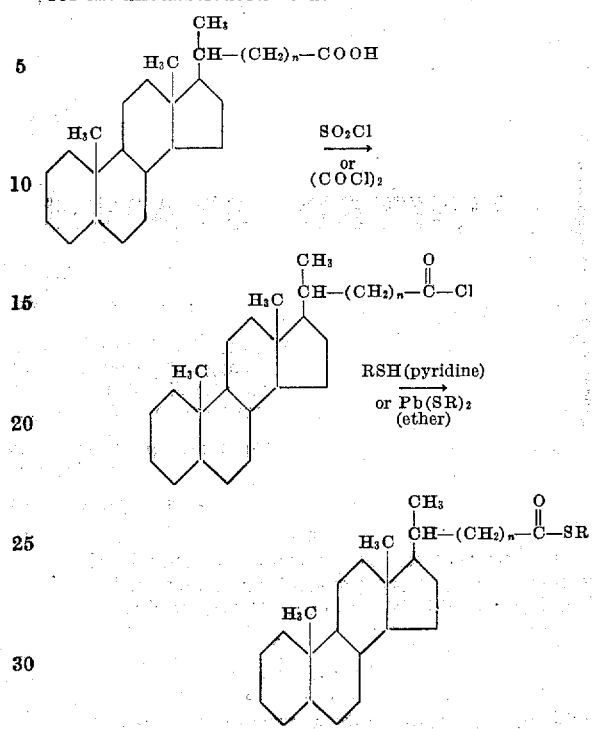

wherein: $n$ is 0, 1, or 2; and R is thioalcohol residue, usually hydrocarbon in nature. Both of the procedures have proven suitable, the first apparently giving better yields of crude product, and the second apparently yielding a somewhat purer product. The thioesterification may also be accomplished by reaction of the free acid with a mercaptan, with or without an esterification, e. g., acidic, catalyst.

The choice of the R radical in the thioester is arbitrary, the availability of the mercaptan or mercaptide being the only limiting factor. R may thus be alkyl, e. g., methyl, ethyl, propyl, isopropyl, butyl, isobutyl, amyl, n-octyl, dodecyl or the like; cycloalkyl, e. g., cyclopentyl, cyclohexyl; cycloalkylalkyl, e. g., cyclohexylmethyl; aryl, e. g., phenyl, naphthyl; or aralkyl, e. g., benzyl or phenethyl. Unsaturated alipathics and cycloaliphatics may also be employed provided the required starting material is available. Substituted hydrocarbon radicals, e. g., chlorobenzyl, nitrophenyl, bromoethyl, and aminopropyl, are also satisfactory thioalcohol starting materials.

*Procedure A—Mercaptan*

The acid chloride, usually in an organic solvent, such as anhydrous benzene, toluene, xylene, ether, or petroleum hydrocarbons, is admixed with selected mercaptan. Equimolar proportions are satisfactory, but an excess of mercaptan may sometimes be employed to advantage. The reaction mixture is allowed to stand at about room temperature, 15–30 hours usually being sufficient time for complete reaction. Gentle heating sometimes increases the reaction rate, but is not usually necessary. The temperature range is usually about zero to 150 degrees centigrade. The presence of an acid-binding agent is not essential, but is usually advantageous in increasing the reaction rate. The reaction product may be worked up with water and organic solvent, e. g., ether, aqueous portions extracted, and combined organic layer washed with water, dilute alkali, dilute acid, and finally again with water. After drying the neutral fraction and evaporating solvent, the residual oil may be crystallized from a suitable solvent, e. g. alcohol, to yield the desired thioester, usually a stable solid.

*Procedure B.—Lead mercaptide*

The acid chloride, usually in an inert organic solvent, is added to a selected metallic mercaptide and an inert organic solvent or vice versa. Equimolar proportions are satisfactory, other ratios may be used if desired. Temperature range is usually about zero to 150 degrees centigrade. The reaction mixture is allowed to stand with occasional swirling, gentle heating if desired. After 15–30 hours the metallic mercaptide is usually completely converted to the metallic chloride, and the reaction product may be worked up as in Procedure A.

The thioesters have been found to be stable materials, and, after preparation of a specific hydroxy-containing thioester, the hydroxy group may be converted to an acyloxy group without disruption of the thioester.

The following examples are given to illustrate the practice of the present invention, but are in no way to be construed as limiting.

*Example 1.—Benzyl 3-alpha,12-alpha-diacetoxy-nor-thiocholanate*

To 1.5 grams (0.0033 mole) of 3-alpha,12-alpha-diacetoxy-nor-cholanic acid was added 6 milliliters (9.8 grams, 0.082 mole) of purified thionyl chloride (Fieser, Experiments in Organic Chemistry, Part II, Heath and Co., New York, 1941, p. 381). The acid dissolved within five minutes and the solution was allowed to stand, with occasional swirling, at room temperature for one hour. Twenty milliliters of 1:1 mixture of anhydrous benzene and ether was then added and the whole evaporated to dryness in vacuo at 40 degrees centigrade. This process of treatment with benzene-ether was repeated twice to ensure complete removal of excess thionyl chloride.

To the resulting acid chloride dissolved in 10 milliliters of anhydrous benzene was added 0.4 milliliter (0.005 mole) of dry pyridine and 2 milliliters (1.12 grams, 0.009 mole) of benzyl mercaptan, a precipitate soon forming. After standing for twenty-four hours at room temperature, the mixture was diluted with 15 milliliters of water and 15 milliliters of ether, whereafter the precipitate dissolved and the ether-benzene phase was separated. The aqueous portion was extracted with two 15-milliliter portions of ether, and the combined ether-benzene layer was washed with 30 milliliter portions of water, one per cent sodium hydroxide, one per cent hydrochloric acid, and finally again with water. The neutral fraction was dried over anhydrous sodium sulfate, the solvent evaporated to dryness in vacuo, and the residual oil crystallized from 50 milliliters of 95 per cent alcohol to give 1.38 grams (73 per cent) of product, M. P. 147–152 degrees centigrade. After three recrystallizations from alcohol, 1.23 grams (65.6 per cent) of the benzyl thio ester with a constant melting point of 154–156 degrees centigrade (corr.) was obtained.

*Example 2.—Ethyl 3-alpha,12-alpha-diformoxy-thiocholanate*

The acid chloride (prepared from 4.5 grams (0.01 mole) of 3-alpha,12-alpha-diformyl-desoxycholic acid in the manner described in Example 1) was dissolved in 30 milliliters of anhydrous ether and added to 1.8 grams (0.0055 mole) of lead ethyl mercaptide covered with 20 milliliters of anhydrous ether. The mixture was allowed to stand at room temperature with occasional swirling, the yellow lead mercaptide being gradually replaced by white lead chloride. After twenty-four hours, the solution was filtered and the precipitate washed with 50 milliliters of ether. The combined ether filtrate was washed with 100 milliliters of one per cent sodium hydroxide and 300 milliliters of water, then dried over anhydrous sodium sulfate and evaporated to dryness in vacuo on a steam bath. The residual oil was dissolved in 50 milliliters of hot alcohol and 10 milliliters of water added. On cooling, an oil separated, taking with it all the color in the solution. Crystallization yielded 2.2 grams of material. An additional 0.32 gram of crystals was obtained by crystallizing the oil from alcohol, the total yield being 2.52 grams (51 per cent of the theoretical), M. P. 105–110 degrees centigrade. After three recrystallizations, the melting point was constant at 111–112 degrees centigrade (corr.).

*Example 3.—Ethyl 3-alpha-hydroxy-12-alpha-acetoxy-nor-thiocholanate*

A solution of 2.1 grams of 3-alpha-hydroxy-12-alpha-acetoxy-nor-cholanic acid in 8 milliliters of thionyl chloride was allowed to stand an hour at room temperature. After removal of thionyl chloride, the 3-alpha-hydroxy-12-alpha-acetoxy-nor-cholanyl chloride was dissolved in 10 milliliters of benzene by warming. The solution was cooled and 0.6 milliliter of pyridine and 1.9 milliliters of ethyl mercaptan were added in the order stated. The reaction mixture was allowed to stand for a day at room temperature, then diluted with 100 milliliters of ether and washed successively with water, one per cent sodium hydroxide, dilute hydrochloric acid, and water. After drying and evaporation of the ether, the desired product weighed 2.3 grams (96 per cent of the theoretical).

*Example 4.—Ethyl 3-alpha,12-alpha-diacetoxy-nor-thiocholanate*

A solution of 501 milligrams of ethyl 3-alpha-hydroxy-12-alpha-acetoxy-nor-thiocholanate in 10 milliliters of acetic anhydride and 10 milliliters of pyridine was heated on the steam bath for one and one-half hours, then distilled in vacuo. The residue was partly crystalline, and, after chromatography and elution with benzene, the eluted fractions were combined and crystallized from alcohol and water to give a yield of 120 milligrams, M. P. 85–87 degrees centigrade. Recrystallization gave a product, M. P. 90–91 degrees centigrade, identical with that obtained directly from 3-alpha,12-alpha-diacetoxy-nor-cholanic acid.

*Example 5.—Ethyl 3-formoxy-thiocholanate*

Eight grams (0.02 mole) of 3-formoxy-litho-cholic acid was placed in a 100-milliliter flask equipped with a side-inlet. Fifteen milliliters of thionyl chloride was added, and the mixture allowed to stand at room temperature with occasional shaking for one hour. Twenty milliliters of dry ether with benzene (1:1) was then added and the solvent removed in vacuo. The addition and removal of ether-benzene was repeated three times.

Four grams of lead ethyl mercaptide was covered with thirty milliliters of anhydrous ether, and the acid chloride in sixty milliliters of anhydrous ether added thereto. The mixture was stirred and allowed to stand overnight at room temperature. The reaction product was filtered, insoluble material washed with several milliliters of ether, the filtrate transferred to a separatory funnel and washed with three 50-milliliter portions of one per cent cold sodium hydroxide, then with 300 milliliters of water, and the water layer discarded. The ether phase was dried over anhydrous sodium sulfate, evaporated to dryness, the residue taken up in 50-75 milliliters of ethyl alcohol, and the alcohol solution cooled. Colored matter separated out and crystallization took place in the clear solution. The material was further cooled and filtered to yield 6.5 grams (73 per cent) of the desired product, having a melting point of 70-75 degrees centigrade.

Example 6.—Ethyl 3-formoxy-thiocholanate

The acid chloride was prepared by the method of Example 5, using 8.0 grams (0.02 mole) of 3-formyl-lithocholic acid and 15 milliliters of thionyl chloride. Forty milliliters of benzene was added to dissolve the acid chloride.

The benzene solution was added to 0.03 mole (2.4 milliliters) of pyridine and 0.10 mole (7.4 milliliters) of ethyl mercaptan. The reaction mixture was allowed to stand for two days at room temperature and was rinsed into a 500-milliliter separatory funnel with 100 milliliters of ether and 100 milliliters of water. The ether-benzene solution was separated and washed with 100 milliliters of one per cent sodium hydroxide, 100 milliliters of 3 normal hydrochloride acid, and water, in the order given. The ether solution was dried, ether removed, and the residue taken up in ethyl alcohol and crystallized in the manner given in Example 5. The yield was 7.3 grams (82 per cent); melting point 80-82 degrees centigrade.

Example 7.—Ethyl 3-acetoxy-(delta 5)-thiocholenate

Three grams (.0076 mole) of 3-acetoxy-(delta 5)-cholenic acid was placed in a 50-milliliter side-inlet flask with 6.0 milliliters (.054 mole) of thionyl chloride and allowed to stand for one hour with occasional shaking. Fifteen milliliters of dry ether and benzene (1:1) was then added, and the solvent removed in vacuo. The addition and removal of ether-benzene was repeated three times.

Fifteen milliliters of benzene was added to the acid chloride without removal from the original flask, whereafter .0114 mole (.91 milliliters) of pyridine and .0380 mole (2.8 milliliters) of ethyl mercaptan was added to the benzene solution. The reaction mixture was allowed to stand for one day at room temperature and was then rinsed into a 100-milliliter separatory funnel with 30 milliliters of ether and 30 milliliters of water. The ether-benzene solution was separated and washed by the procedure of Example 5. Two and four-tenths grams of ethyl 3-acetoxy-(delta 5)-thiocholenate, melting at 100 to 102 degrees centigrade, was obtained, the yield being 73.0 per cent.

Example 8.—Ethyl 3-acetoxy-(delta 5)-thiocholanate

Three grams (.0076 mole) of 3-acetoxy-(delta 5)-cholenic acid was placed in a 50-milliliter side-inlet flask with 6.0 milliliters (.054 mole) of thionyl chloride and allowed to stand for one hour with occasional shaking. Fifteen milliliters of dry ether and benzene (1:1) was added and the solvent removed in vacuo. The addition and removal of etherbenzene was repeated three times.

Lead ethyl mercaptide was covered with 10 milliliters of anhydrous ether, and the acid chloride in 20 milliliters of anhydrous ether added thereto. The mixture was stirred for 4-6 hours and allowed to stand overnight at room temperature. The mixture was filtered and insoluble material washed with a few milliliters of ether, the filtrate transferred to a separatory funnel and washed with 50 milliliters of one per cent cold sodium hydroxide and 100 milliliters of water, after which the water layer was discarded. The ether phase was dried over anhydrous sodium sulfate, filtered, and evaporated to dryness. The residue was taken up in 35 milliliters of alcohol and cooled. Crystallization took place, the material was further cooled in a refrigerator, and the crystals were separated. One and seven-tenths grams of ethyl 3-acetoxy-(delta 5)-thiocholenate, melting at 101-103 degrees centigrade, was obtained.

Example 9.—Ethyl 3-methoxy-(delta 5)-bisnor-thiocholenate

A suspension of the sodium salt of 3-methoxy-(delta 5)-bisnor-cholenic acid in 5-10 parts of benzene is treated with 1.2 to 1.5 parts of oxalyl chloride at room temperature. When the evolution of a gas ceases the mixture is heated under reflux for 1-2 hours. The benzene and excess oxalyl chloride are removed by heating in vacuo, and the residue is dissolved in 5-10 parts of benzene and treated with 1.5 to 2 equivalents of ethyl mercaptan and 1-1.5 equivalents of pyridine. The reaction mixture is allowed to stand a day at room temperature, and is then taken up in ether. The ether solution is washed with dilute hydrochloric acid, dilute sodium hydroxide, and water, and is then evaporated in vacuo. The residue consists of ethyl 3-methoxy-(delta 5)-bisnor-thiocholenate, M. P. 94-96 degrees centigrade.

Example 10.—Ethyl thiodehydrocholate

A mixture of dehydrocholic acid, 10 parts of benzene, and 2.5-3 parts of oxalyl chloride is heated under reflux for 1-2 hours. The reaction mixture is then evaporated in vacuo, dissolved in 5-10 parts of benzene, and treated with 1-1.5 equivalents of pyridine and 1.5-2 parts of ethyl mercaptan. After standing a day the reaction mixture is taken up in ether and washed with dilute hydrochloric acid, then with dilute alkali, and with water. The ether solution is evaporated in vacuo to give ethyl thiodehydrocholate, M. P. 244-246.5 degrees centigrade.

Example 11.—11-keto-thiocholanate

A suspension of the sodium salt of 11-keto-cholanic acid in 10 parts of benzene is treated at room temperature with 1.2-1.5 equivalents of oxalyl chloride. When evolution of gas has ended, the mixture is heated under reflux for 1-2 hours, and then evaporated in vacuo. The residue is dissolved in 5-10 parts of benzene and treated with 1-1.5 equivalents of pyridine and 1.5-2 equivalents of ethyl mercaptan. The reaction mixture is allowed to stand a day, and is then dissolved in ether and washed with dilute acid, dilute alkai, and water. The ether solution is evaporated to give a residue consisting of ethyl 11-keto-thiocholanate.

Example 12.—Ethyl 3-benzoyloxy-(delta 5)-thiocholenate

A mixture of 3-benzoyloxy-(delta 5)-cholenic acid and 5–10 parts of thionyl chloride is allowed to stand at room temperature 1–3 hours, then is evaporated in vacuo. The residue is dissolved in 5–10 parts of benzene and treated with 1–1.5 equivalents of pyridine and 1.5–2 equivalents of ethyl mercaptan. After standing a day the reaction mixture is poured into ether and washed with dilute acid, dilute alkali, and water, then is evaporated in vacuo. The residue is ethyl 3-benzoyloxy-(delta 5)-thiocholenate. After crystallization from a benzene-alcohol mixture, the compound melts at 178–182 degrees centigrade.

Physical properties of thio esters prepared according to the procedure of the present invention are given in Table I.

bond, and a double bond protected by addition thereto of $X_2$ or HX, wherein X is a halogen atom, or as an i-ether or ester. R' may thus be methyl, ethyl, propyl, butyl, n-octyl, dodecyl, phenyl, benzyl and naphthyl. R'' may be methyl, ethyl, propyl, isopropyl, n-octyl, benzyl, or the like. These compounds are all prepared by reaction of a selected nuclearly-substituted pregnane compound with a thioesterifying agent according to the procedure previously outlined for the method of the present invention.

Various modifications may be made in the present invention, and it is to be understood that we limit ourselves only as defined in the appended claims, in which the term "nucleus" is to be understood as indicating an unsubstituted nucleus or one containing substituents, as indicated previously.

Table I.—Esters of steroid acids

| Compound | M. P., °C.[1] | Rotation[2] (alpha) D | Molecular Formula | Analyses, Per Cent ||||||
|---|---|---|---|---|---|---|---|---|---|
| | | | | Carbon || Hydrogen || Sulfur ||
| | | | | Calcd. | Found | Calcd. | Found | Calcd. | Found |
| ethyl 3-beta-hydroxy-(delta 5)-thiocholenate | 108.5–109.5 | −38.5 | $C_{26}H_{42}O_2S$ | 74.59 | 74.64 | 10.00 | 10.07 | 7.66 | 7.79 |
| ethyl 3-beta-formoxy-(delta 5)-thiocholenate | 81 – 82 | −47.5 | $C_{27}H_{42}O_3S$ | 72.60 | 72.07 | 9.48 | 9.61 | 7.18 | 7.01 |
| ethyl 3-beta-acetoxy-(delta 5)-thiocholenate | 101.5–103.5 | −40.9 | $C_{28}H_{44}O_3S$ | 72.99 | 72.92 | 9.63 | 9.69 | 6.98 | 7.36 |
| isopropyl 3-beta-acetoxy-(delta 5)-thiocholenate | 131 –133 | −40.4 | $C_{29}H_{46}O_3S$ | 73.37 | 73.39 | 9.77 | 9.55 | 6.75 | 6.81 |
| tert.-butyl 3-beta-acetoxy-(delta 5)-thiocholenate | 169.5–171 | −39.8 | $C_{30}H_{48}O_3S$ | 73.72 | 74.07 | 9.90 | 9.96 | 6.56 | 6.71 |
| n-hexyl-3-beta-acetoxy-(delta 5)-thiocholenate | 77.5– 79.5 | −35.4 | $C_{32}H_{52}O_3S$ | 74.37 | 74.70 | 10.14 | 10.00 | 6.20 | 6.60 |
| ethyl-3-chloro-(delta 5)-thiocholenate | 103.5–105 | −30.4 | $C_{26}H_{41}OSCl$ | 71.44 | 71.51 | 9.46 | 9.58 | 8.11 | [4]8.75 |
| ethyl-3-beta-acetoxy-5-chloro-nor-thiocholenate | 165 –168 | | $C_{28}H_{43}O_3SCl$ | | | | | 6.45 | 6.32 |
| ethyl 3-beta-acetoxy-(delta 5)-bisnor-thiocholenate | 132 –133 | −38.0 | $C_{26}H_{40}O_3S$ | 72.18 | 72.50 | 9.32 | 9.13 | 7.41 | 7.44 |
| ethyl 3-alpha,12-diformoxy[3] thiocholenate | 111 –112 | +92.1 | $C_{28}H_{44}O_5S$ | 68.25 | 68.39 | 9.00 | 8.89 | 6.51 | 6.51 |
| ethyl 3-alpha-formoxy thiocholanate | 81 – 82 | +41.3 | $C_{27}H_{44}O_3S$ | 72.27 | 72.53 | 9.88 | 9.74 | 7.14 | 7.23 |
| ethyl 3-alpha,12-diacetoxy-nor-thiocholanate | 91 – 91.5 | +96.0 | $C_{29}H_{46}O_5S$ | 68.76 | 69.07 | 9.15 | 9.47 | 6.33 | 6.37 |
| benzyl 3-alpha,12-alpha-diacetoxy-nor-thiocholanate | 154 –156 | +95.5 | $C_{34}H_{48}O_5S$ | 71.79 | 71.56 | 8.51 | 8.79 | 5.64 | 5.66 |
| phenyl 3-alpha,12-alpha-diacetoxy-nor-thiocholanate | 146 –147 | +99.7 | $C_{33}H_{46}O_5S$ | 71.44 | 71.30 | 8.36 | 8.04 | 5.78 | 5.64 |
| phenyl 3-beta-acetoxy-(delta 5)-thiocholenate | 128.5–130 | | | 75.40 | 75.11 | 8.90 | 8.59 | 6.29 | 6.89 |
| benzyl 3-beta-acetoxy-(delta 5)thiocholenate | 85 – 86.5 | | | 75.67 | 75.77 | 9.05 | 8.72 | | |
| ethyl 3-alpha,7-alpha,12-alpha-triformoxy-thiocholanate | c.128 | | | 64.77 | 65.78 | 8.44 | 8.07 | | |
| ethyl 3-alpha-hydroxy-12-alpha-acetoxythiocholanate | | | | 69.78 | 70.72 | 9.54 | 9.34 | | |
| ethyl 3-methoxy-(delta 5)-bisnor-thiocholenate | 94 – 96 | | | | | | | | |
| ethyl 3-benzoyloxy-(delta 5)-thiocholenate | 178 –182 | | | | | | | | |
| ethyl thiodehydrocholate | 244 –246.5 | | | | | | | | |

[1] All M. P.'s corrected.
[2] Rotations taken at approximately 25° C. in chloroform with a 1 cm. tube.
[3] Desoxycholic acid is formulated as 3-alpha,12-alpha, according to the latest evidence (Ann. Rev. Biochem. 15, 162 (1946)).
[4] Chlorine analysis.

The novel compounds of the present invention have the formula:

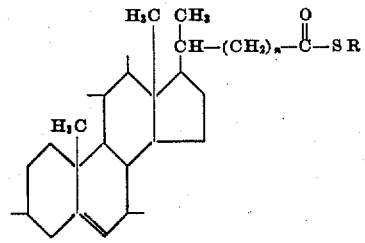

wherein: n is selected from zero, one, and two; R is a hydrocarbon radical; the 3, 7, 11 and 12 positions may be substituted with a member of the group consisting of =O, −OH, X, OCOR', and OR'', wherein R' and R'' are hydrocarbon radicals, and X is a halogen atom; and the 5, 6 bond is selected from a double bond, a saturated

We claim:

1. A compound of the formula:

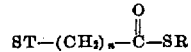

wherein ST represents a nucleus selected from the group consisting of pregnane and pregnene nuclei, which is attached to the side-chain in the 20 position; n is selected from 0, 1, and 2; and R represents a hydrocarbon radical containing up to and including 12 carbon atoms.

2. A compound of the formula:

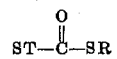

wherein ST represents a nucleus selected from the group consisting of pregnane and pregnene nuclei, which is attached to the side-chain in the 20 position, and R represents a lower-alkyl radical.

3. A compound of the formula:

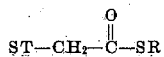

wherein ST represents a nucleus selected from the group consisting of pregnane and pregnene nuclei, which is attached to the side-chain in the 20 position, and R represents a hydrocarbon radical containing up to and including 7 carbon atoms.

4. A compound of the formula:

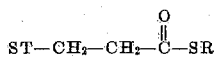

wherein ST represents a nucleus selected from the group consisting of pregnane and pregnene nuclei, which is attached to the side-chain in the 20 position, and R represents a hydrocarbon radical containing up to and including 7 carbon atoms.

5. Ethyl 3-acetoxy-(delta 5)-thiocholenate.

6. Ethyl 3-acetoxy-(delta 5)-bisnor-thiocholenate.

7. Ethyl 3,12-diformoxy-thiocholanate.

8. Ethyl 3,12-diacetoxy-nor-thiocholanate.

9. Ethyl 3,7,12-triformoxythiocholanate.

10. A lower-alkyl(delta 5)-thiocholenate.

11. A lower-alkyl (delta 5)-bisnorthiocholenate.

12. A cholanic acid thioester wherein the esterifying group is a hydrocarbon radical containing up to and including seven carbon atoms.

ROBERT H. LEVIN.
A. VERN McINTOSH, Jr.
GEORGE B. SPERO.

REFERENCES CITED

The following references are of record in the file of this patent:

UNITED STATES PATENTS

| Number | Name | Date |
|---|---|---|
| 2,180,095 | Strassberger | Nov. 14, 1939 |
| 2,212,895 | Allen | Aug. 27, 1940 |

Certificate of Correction

Patent No. 2,566,342 — September 4, 1951

ROBERT H. LEVIN ET AL.

It is hereby certified that error appears in the printed specification of the above numbered patent requiring correction as follows:

Column 4, line 50, for "alipathics" read *aliphatics*; column 5, line 66, for "(65.6 per cent)" read *(65.5 per cent)*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*